United States Patent
Cui et al.

(10) Patent No.: US 12,389,476 B2
(45) Date of Patent: Aug. 12, 2025

(54) DYNAMIC SELECTION OF RADIO ACCESS NETWORK (RAN) AMONG AVAILABLE RAN ARCHITECTURAL ALTERNATIVES

(71) Applicant: AT&T Intellectual Property I, L.P., Atlanta, GA (US)

(72) Inventors: Zhi Cui, Sugar Hill, GA (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 374 days.

(21) Appl. No.: 17/686,553

(22) Filed: Mar. 4, 2022

(65) Prior Publication Data

US 2023/0284301 A1   Sep. 7, 2023

(51) Int. Cl.
  *H04W 76/15*   (2018.01)
  *H04W 28/02*   (2009.01)

(52) U.S. Cl.
  CPC ....... *H04W 76/15* (2018.02); *H04W 28/0215* (2013.01); *H04W 28/0231* (2013.01)

(58) Field of Classification Search
  CPC ............. H04W 76/15; H04W 28/0215; H04W 28/0231; H04W 24/02; H04W 8/22; H04W 76/16; H04W 88/18
  See application file for complete search history.

(56) References Cited

U.S. PATENT DOCUMENTS

| | | | | |
|---|---|---|---|---|
| 11,844,013 | B1* | 12/2023 | Shahid | H04W 16/14 |
| 2010/0075665 | A1* | 3/2010 | Nader | H04W 36/24 |
| | | | | 455/437 |
| 2013/0136032 | A1 | 5/2013 | Meirosu et al. | |
| 2014/0213256 | A1* | 7/2014 | Meylan | H04W 36/22 |
| | | | | 455/436 |
| 2014/0329528 | A1 | 11/2014 | Zhao et al. | |
| 2015/0005023 | A1* | 1/2015 | Wang | H04W 48/18 |
| | | | | 455/509 |
| 2015/0092552 | A1 | 4/2015 | Bajj et al. | |
| 2019/0166549 | A1 | 5/2019 | Ahmavaara et al. | |
| 2019/0229864 | A1 | 7/2019 | Kim et al. | |
| 2020/0092759 | A1* | 3/2020 | Dasgupta | H04W 36/0027 |
| 2020/0106536 | A1 | 4/2020 | Bedekar | |
| 2020/0228993 | A1 | 7/2020 | Gunasekara et al. | |
| 2020/0252142 | A1 | 8/2020 | Bedekar | |
| 2020/0314704 | A1 | 10/2020 | Abdel Shahid et al. | |

(Continued)

*Primary Examiner* — Sudesh M. Patidar
(74) *Attorney, Agent, or Firm* — Guntin & Gust, PLC; Erik Boyd

(57) ABSTRACT

Aspects of the subject disclosure may include, for example, determining a capability of a mobile device, collecting a mobile station measurement, applying a rule according to the capability and measurement to obtain a radio access network (RAN) recommendation that identifies one of a first or second RANs as a preferred RAN, wherein a service is provided to the device via the preferred RAN. The first RAN comprises a first base station that supports a first exchange of user data and corresponding control signaling to facilitate access to a first set of services. The second RAN comprises a second base station adapted to support a second exchange of user data and a third base station adapted to support a corresponding exchange of control signaling to facilitate access to a second set of services. The second RAN is unable to facilitate access to the first set of services. Other embodiments are disclosed.

20 Claims, 9 Drawing Sheets

(56) References Cited

U.S. PATENT DOCUMENTS

| | | |
|---|---|---|
| 2020/0329425 A1 | 10/2020 | Ahmavaara et al. |
| 2020/0336376 A1 | 10/2020 | Mahdi et al. |
| 2020/0396667 A1* | 12/2020 | Kaasalainen ......... H04W 76/10 |
| 2021/0045193 A1 | 2/2021 | Mishra et al. |
| 2021/0051748 A1 | 2/2021 | Xu et al. |
| 2021/0099942 A1 | 4/2021 | Tripathi et al. |
| 2021/0211949 A1 | 7/2021 | Pakniat et al. |
| 2021/0235277 A1 | 7/2021 | Parekh et al. |
| 2021/0258969 A1 | 8/2021 | Yang et al. |
| 2021/0289406 A1 | 9/2021 | Feki et al. |
| 2021/0306899 A1 | 9/2021 | Mishra et al. |
| 2021/0337620 A1 | 10/2021 | Zhu et al. |
| 2021/0345207 A1* | 11/2021 | Sun ......................... H04W 8/02 |
| 2021/0385302 A1 | 12/2021 | Cakulev et al. |
| 2021/0385682 A1 | 12/2021 | Bedekar et al. |
| 2021/0400748 A1 | 12/2021 | Subramanian et al. |
| 2021/0410206 A1 | 12/2021 | Cao |
| 2022/0015029 A1 | 1/2022 | Wang et al. |
| 2022/0030417 A1 | 1/2022 | Carames et al. |
| 2022/0030495 A1* | 1/2022 | Qiao ...................... H04W 4/025 |
| 2022/0038940 A1 | 2/2022 | Kotecha et al. |
| 2022/0046343 A1 | 2/2022 | Hoole et al. |
| 2022/0046433 A1 | 2/2022 | Bedekar et al. |
| 2022/0053374 A1 | 2/2022 | Bynum et al. |
| 2022/0264370 A1* | 8/2022 | Qiao ................. H04W 28/0967 |
| 2022/0264437 A1* | 8/2022 | Raghavachari ....... H04W 48/18 |
| 2023/0121268 A1* | 4/2023 | Mueller ................ H04L 41/147 |
| | | 370/229 |
| 2023/0164598 A1* | 5/2023 | Yao ....................... H04W 24/04 |
| | | 370/252 |
| 2023/0180131 A1* | 6/2023 | Kragten ............ H04W 52/0251 |
| | | 455/574 |
| 2023/0300674 A1* | 9/2023 | Kedalagudde ....... H04W 24/10 |
| | | 370/230.1 |

* cited by examiner

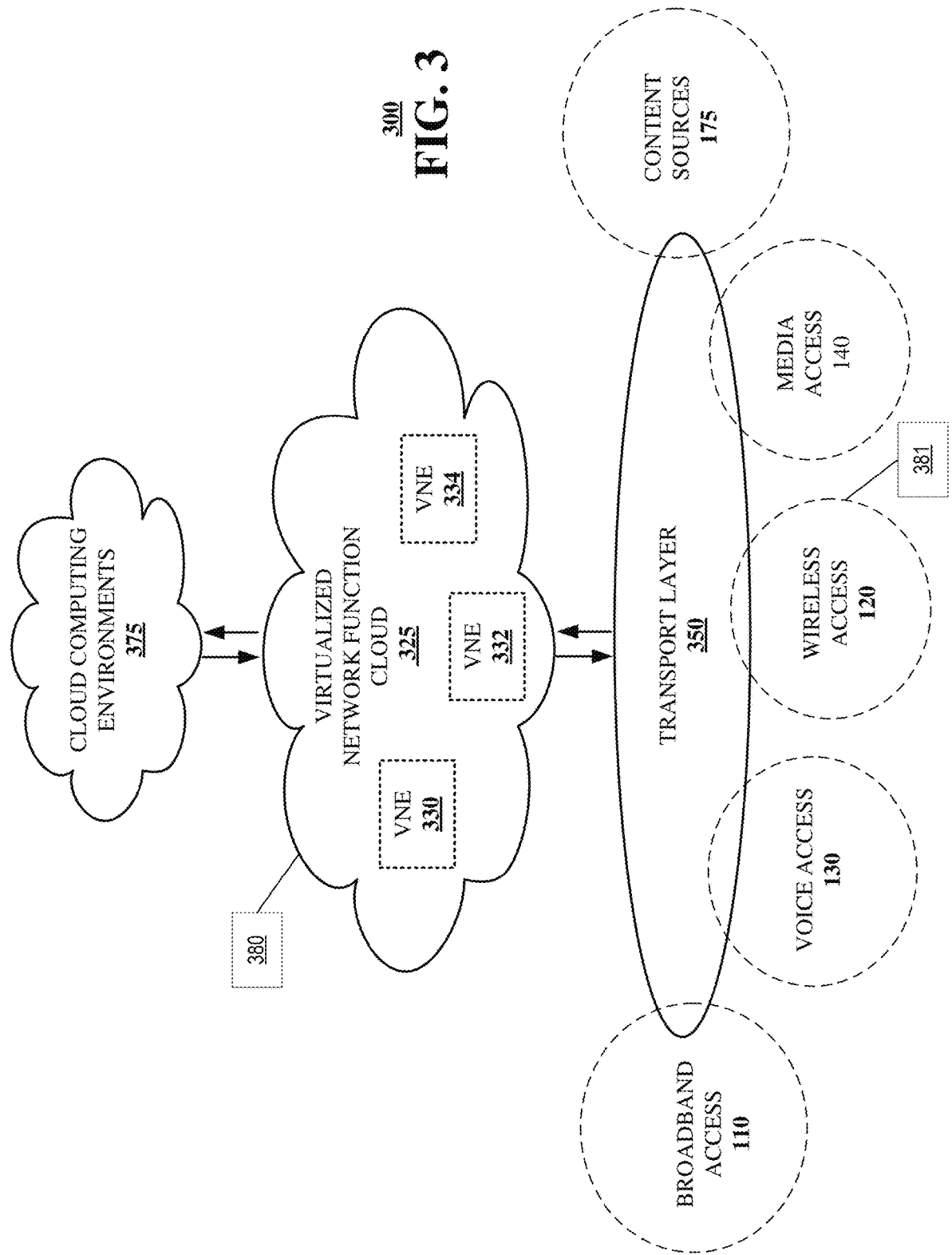

DYNAMIC SELECTION OF RADIO ACCESS NETWORK (RAN) AMONG AVAILABLE RAN ARCHITECTURAL ALTERNATIVES

FIELD OF THE DISCLOSURE

The subject disclosure relates to dynamic selection of radio access network (RAN) among available ran architectural alternatives.

BACKGROUND

The radio frequency (RF) spectrum is a limited resource that is shared among numerous and often competing applications. At least some applications include mobile cellular radio communications, in which portions of the RF spectrum may be licensed to mobile network operators (MNO) who, in turn, provide wireless communications services to mobile devices, such as mobile user devices, e.g., mobile phones and tablet computers, and other mobile devices, e.g., devices enabled for machine-type or machine-to-machine communications, including the Internet of Things (IoT). Wireless communication services may include, without limitation, digital messaging services, voice services, file exchange services, web browsing services, streaming media services, and so on.

MNOs may provision wireless coverage in one or more coverages areas by operating one or more wireless access points that provide respective and sometimes overlapping wireless coverage according to respective cells. The cells support communications between the wireless access points and any mobile devices that may be present within the coverage area. The wireless access points, in turn, may be connected to other networks to further enable wireless access between the mobile devices and the other networks. According to a wireless service, messages may be exchanged between a wireless device and a proximal wireless access point over a predetermined air interface, to provide network accessible services to the mobile devices. Elements of the MNO network that enable such exchanges of wireless messages with mobile devices may be referred to as a radio access network (RAN).

In the interest of interoperability, and to promote wider deliver of mobile services, industry standards have been developed and adopted by equipment vendors and MNOs alike. At least some of these standards are referred to as Third Generation Partnership Project (3GPP), an umbrella term for a number of standards organizations that develop protocols for mobile communications. 3GPP standards have developed incrementally, and continue to do so, with certain major upgrades referred to as generations, e.g., 3G, 4G, 5G and so on. With each generation come improved and/or expanded wireless services, that also impose new requirements on equipment and MNOs.

For example, an MNO may have deployed one mobile network adapted to provide wireless services according to newer generational group of standards, e.g., 5G, while also providing wireless services to one or more legacy generational groups of standards. Newer generational standards typically require updates to MNO equipment, e.g., wireless access points, user equipment, e.g., mobile phones, or both. Accordingly, newer standards are most often deployed, at least temporarily, in a layered approach in which MNOs support mobile operation with user equipment of both the newer and legacy generational groups of standards.

The 3GPP 5G group of standards define a so called new radio (NR) interface that includes new radio access technology enabling access to new portions or bands of the RF spectrum. In particular, 5G NR supports operation in licensed and unlicensed bands according to a number of low, mid and high frequency bands that are broken into a first frequency range (FR1) and a second frequency range (FR2). The first frequency range includes frequency bands that are less than 6 GHZ, while the second frequency range includes bands withing a lower range combined with a high bandwidth, and at a higher range, e.g., millimeter wave from 24.25 GHz to 52.6 GHZ.

It is envisioned that 5G will ultimately be deployed according to a standalone architecture (SA), in which a RAN that implements NR standards is connected to a 5G core network. Such SA deployments should implement a more complete set of 5G services, such as a full set of 5G Phase-1 services. SA deployments will allow MNOs to build entirely new fully virtualized 5G networks that include NR RANs, new transport networks, new 5G mobile core networks, as well as edge networks that distribute at least some mobile service processing closer to the mobile devices. It is envisioned that fully virtualized, cloud-native architecture will enable end-to-end network slicing to logically separate services, as well as introduce new ways to develop, deploy, and manage services that may include incorporation of microservices and/or service-based interfaces.

At least some MNOs may opt to deploy 5G according to a non-standalone architecture (NSA), in which a 5G RAN with an NR interface may be used in conjunction with an existing 3GPP Long Term Evolution (LTE) and/or evolved packet core (EPC) infrastructure core network, respectively, 4G Radio and 4G Core. The NSA is sometimes referred to as E-UTRA-NR Dual Connectivity (EN-DC) or Architecture Option 3. Such NSA deployments provide user equipment (UE) with access to NR technology without requiring an overall network replacement. Accordingly, the MNO may deliver high-speed connectivity to consumers with 5G enabled devices, while leveraging existing network investments in transport and mobile core. According to NSA deployments, 5G enabled devices will have access to 4G services as well as capacities offered by the 5G NR, e.g., lower latency. Unfortunately, however, the NSA deployments will not offer access to full features of 5G, including the aforementioned example 5G services.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
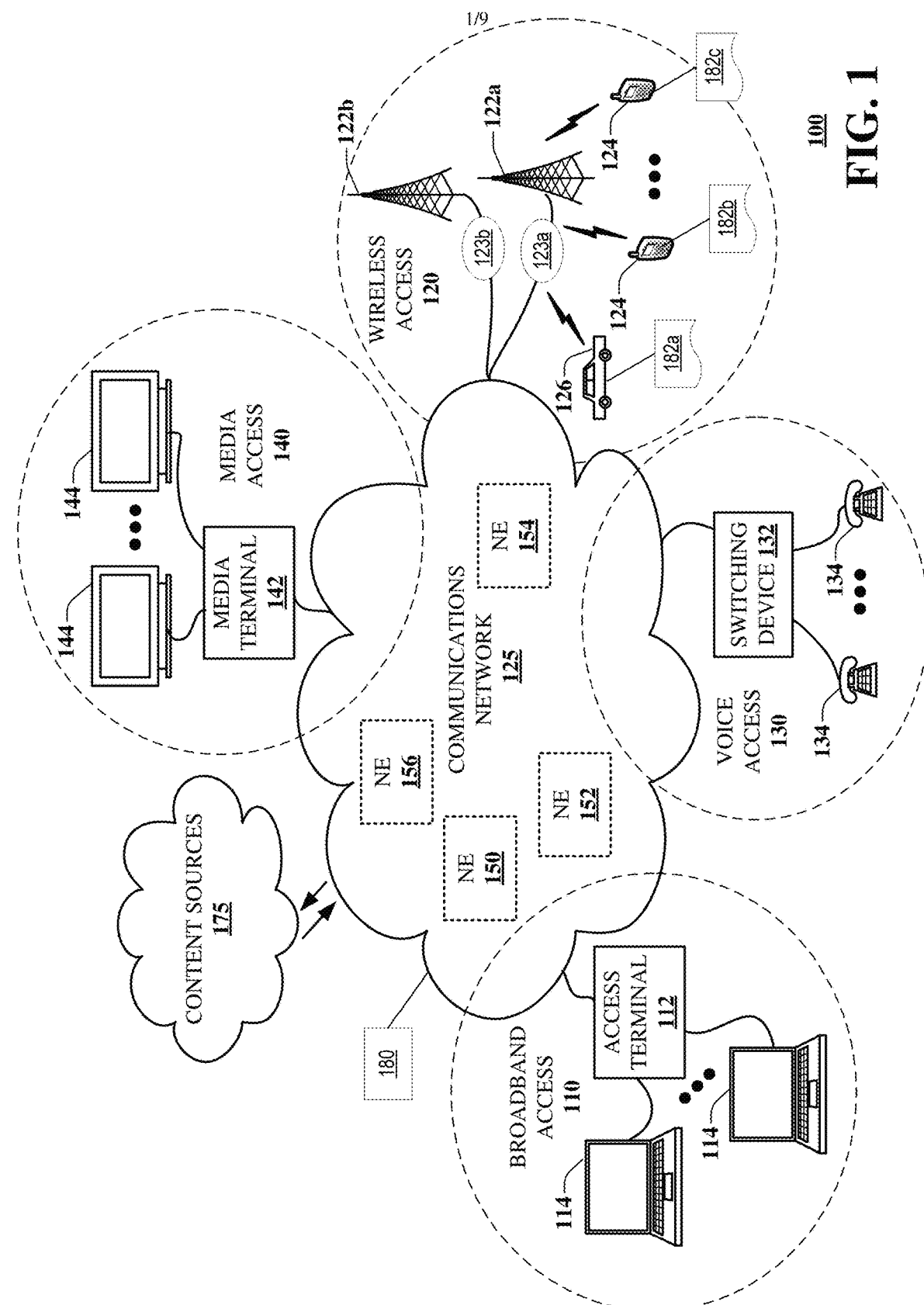
FIG. 1 is a block diagram illustrating an exemplary, non-limiting embodiment of a communications network in accordance with various aspects described herein.

The subject disclosure describes, among other things, illustrative embodiments for dynamically selecting a wireless mobile network architecture, e.g., a 5G NSA mode or a 5G SA mode, to support wireless services to a mobile station based on one or more conditions of the mobile station, such as its coverage condition, its mobility state, its requested application or service, and availability of NR carriers accessible by the mobile station. Other embodiments are described in the subject disclosure.

One or more aspects of the subject disclosure include a system that includes a processing system including a processor, and a memory that stores executable instructions that, when executed by the processing system, facilitate performance of operations. The operations include identifying a capability of a mobile station, collecting a measurement obtained via the mobile station, determining an operational condition of the mobile station according to the measurement, and applying a rule according to the capability and the operational condition to obtain a rule application. A radio access network (RAN) type recommendation is determined according to the rule application, and one of a first RAN type and a second RAN type is selected according to the rule application. The first RAN type includes a first base station adapted to support a first wireless exchange of first control signaling and first user data supported by the first control signaling between the first base station and the mobile station to facilitate mobile station access to a first set of mobile services, whereas, the second RAN type includes a second base station adapted to support a second wireless exchange of second control signaling between the second base station and the mobile station, and a third base station adapted to support a third wireless exchange of second user data supported by the second control signaling between the third base station and the mobile station to facilitate mobile station access to a second set of mobile services, the second RAN type being unable to facilitate mobile station access to the first set of mobile services.

One or more aspects of the subject disclosure include a process that includes determining, by a processing system comprising a processor, a capability of a mobile station, collecting, by the processing system, a measurement corresponding to the mobile station, and applying, by the processing system, a rule according to the capability and the measurement to obtain a rule application comprising a radio access network (RAN) type recommendation. One of a first RAN type and a second RAN type is selected, by the processing system, according to the rule application, wherein the first RAN type includes a first base station adapted to support a first wireless exchange of first user data and corresponding first control signaling between the first base station and the mobile station to facilitate mobile station access to a first set of mobile services. The second RAN type includes second and third base stations, wherein the second base station is adapted to support a second wireless exchange of second user data with the mobile station and the third base station is adapted to support a corresponding wireless exchange of corresponding second control signaling with the mobile station to facilitate mobile station access to a second set of mobile services, the second RAN type being unable to facilitate mobile station access to the first set of mobile services.

One or more aspects of the subject disclosure include a non-transitory, machine-readable medium, including executable instructions that, when executed by a processing system including a processor, facilitate performance of operations. The operations include determining a capability of a mobile station, collecting a measurement corresponding to the mobile station, and applying a rule according to the capability and the measurement to obtain a rule application comprising a radio access network (RAN) type recommendation. One of a first RAN type and a second RAN type is identified as a preferred RAN type according to the rule application, and a mobile service provided to the wireless station via the preferred RAN type. The first RAN type includes a first base station adapted to support a first exchange of first user data and corresponding first control signaling between the first base station and the mobile station to facilitate mobile station access to a first set of mobile services. The second RAN type includes second and third base stations, the second base station adapted to support a second exchange of second user data with the mobile station and the third base station adapted to support a corresponding exchange of second control signaling with the mobile station to facilitate mobile station access to a second set of mobile services. The second RAN type is unable to facilitate mobile station access to the first set of mobile services.

Future generations of radio technologies, and particularly those benefiting from greater bandwidth applications, such as 5G and 6G, will likely use higher frequency portions of the RF spectrum. It is generally understood that higher frequency operation will result in more limited coverage. Despite such coverage limitations, the availability of greater bandwidths will tend to drive adoption of high frequency applications for high throughput services. As the radio technologies continue to evolve from one generation to the next, e.g., Long Term Evolution (LTE) to 5G, 5G to 6G and beyond, it is expected that transitions periods during which MNOs will support overlapping generations will occur for many years. Optimizing applications of newer technologies while supporting co-existence with legacy technologies, e.g., 5G SA, 5G NSA and LTE, will be critical to ensure successful adoptions of 5G, 6G and beyond.

Referring now to FIG. 1, a block diagram is shown illustrating an example, non-limiting embodiment of a system 100 in accordance with various aspects described herein. For example, system 100 can facilitate in whole or in part, determining a capability of a mobile device, collecting a mobile station measurement, applying a rule according to the capability and measurement to obtain a radio access network (RAN) recommendation that identifies one of a first or second RANs as a preferred RAN, wherein a service is provided to the device via the preferred RAN. The first RAN comprises a first base station that supports a first exchange of user data and corresponding control signaling to facilitate access to a first set of services. The second RAN comprises a second base station adapted to support a second exchange of user data and a third base station adapted to support a corresponding exchange of control signaling to facilitate access to a second set of services. The second RAN is unable to facilitate access to the first set of services. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The example system 100 includes a first base station or access point 122a adapted to support a delivery of a first wireless service to a mobile device 124 and/or vehicle 126, according to a first wireless service network architecture. The example system 100 also includes a second base station or access point 122b adapted to support a delivery of a second wireless service to the mobile device 124 and/or vehicle 126, according to a second wireless service network architecture. The first and second network architectures may be deployed and/or otherwise adapted to incorporate different generations of wireless standards. By way of illustration, the first base station or access point 126a may provide NR access to the mobile device 124 over a first RAN to deliver a first service to the mobile device 124. Likewise, the second base station or access point 126b may provide NR access to the mobile device 124 over a second RAN to deliver a second service to the mobile device 124. The first base station 122a may be in communication with a first core network 123a according to a new generation mobile standard, whereas the second base station 122b may be in communication with a second core network 123b, at least in part, according to a legacy generation mobile standard.

By way of example, the first base station 122a may provide wireless services to the mobile device 124 according to a 5G standalone architecture (SA), in which scenario, the mobile device 124 may access 5G-enabled services, such as network slicing and/or edge computing, over a 5G NR enabled wireless channel. Likewise, the second base station 122b may provide wireless services to the mobile device 124 according to a 5G non-standalone architecture (NSA), in which scenario, the mobile device 124 may access 4G legacy services over a 5G NR enabled wireless channel. The mobile device 124 accessing services via the second base station 122b according to the NSA may not be able to access at least some 5G-enabled services that would otherwise be available via the first base station 122a.

In either instance, one or both of the first and second core networks 123a, 123b may be in further communication with one or more other networks, such as the example communication network 125. At least some of the 5G and/or legacy services offered to the mobile device 124 via the wireless access 120 may include network elements, e.g., back-end servers, databases, other mobile devices, and the like, via the communications network 125.

According to the techniques disclosed herein, the example system may include one or more monitoring and/or control aspects adapted to dynamically select among a set of different wireless mobile network architecture, e.g., a 5G NSA mode or a 5G SA mode. Such dynamic architecture selection may be applied to one or more mobile devices 124, 126 operating with proximal, adjacent and/or overlapping wireless coverage regions of the different base stations 122a, 122b. For example, a radio intelligent controller 180 may be provided to monitor one or more conditions of one or more of the mobile devices 124, 126, the base stations 122a, 122b, and/or the respective RANs supported by the different base stations 122. Conditions may include, without limitation, a wireless coverage condition of the mobile device 124, 126, a mobility state of the mobile device 124, 126, an application or service requested by and/or in use by mobile device 124, 126, and/or availability of NR carriers accessible extendable to and/or accessible by the mobile device 124, 126.

The radio intelligent controller 180 may be collocated with one or more of the base stations 122a, 122b. Alternatively or in addition, the radio intelligent controller 1280 may be remote from one or more of the base stations 122a, 122b, e.g., collocated with a radio controller, and/or collocated with one or more of the core networks 123a, 123b, and/or remotely accessible via the communication network 125. It is understood that a single radio intelligent controller 180 may support mobile network architecture selection for one or more of the base stations 122a, 122b. Alternatively or in addition, each of the base stations 122a, 122b may be provisioned with its own respective radio intelligent controller 180.

In operation, the radio intelligent controller 180 may be adapted to apply one or more rules and/or policies according to the monitored conditions to determine or otherwise identify a preferred mobile network architecture. The radio intelligent controller 180 may provide a recommendation to one or more of the first base station 122a, the second base station 122b, or both, and/or the first packet core 122a, the second packet core 122b, or both, based on the preferred network architecture. Responsive to the recommendation, and to the extent the recommendation differs from a current condition, the recipient of the recommendation may initiate an establishment and/or transfer of a provisioning of a wireless service to the mobile device 124, 126 according to a wireless mobile network architecture identified by the recommendation.

Figure 2A:
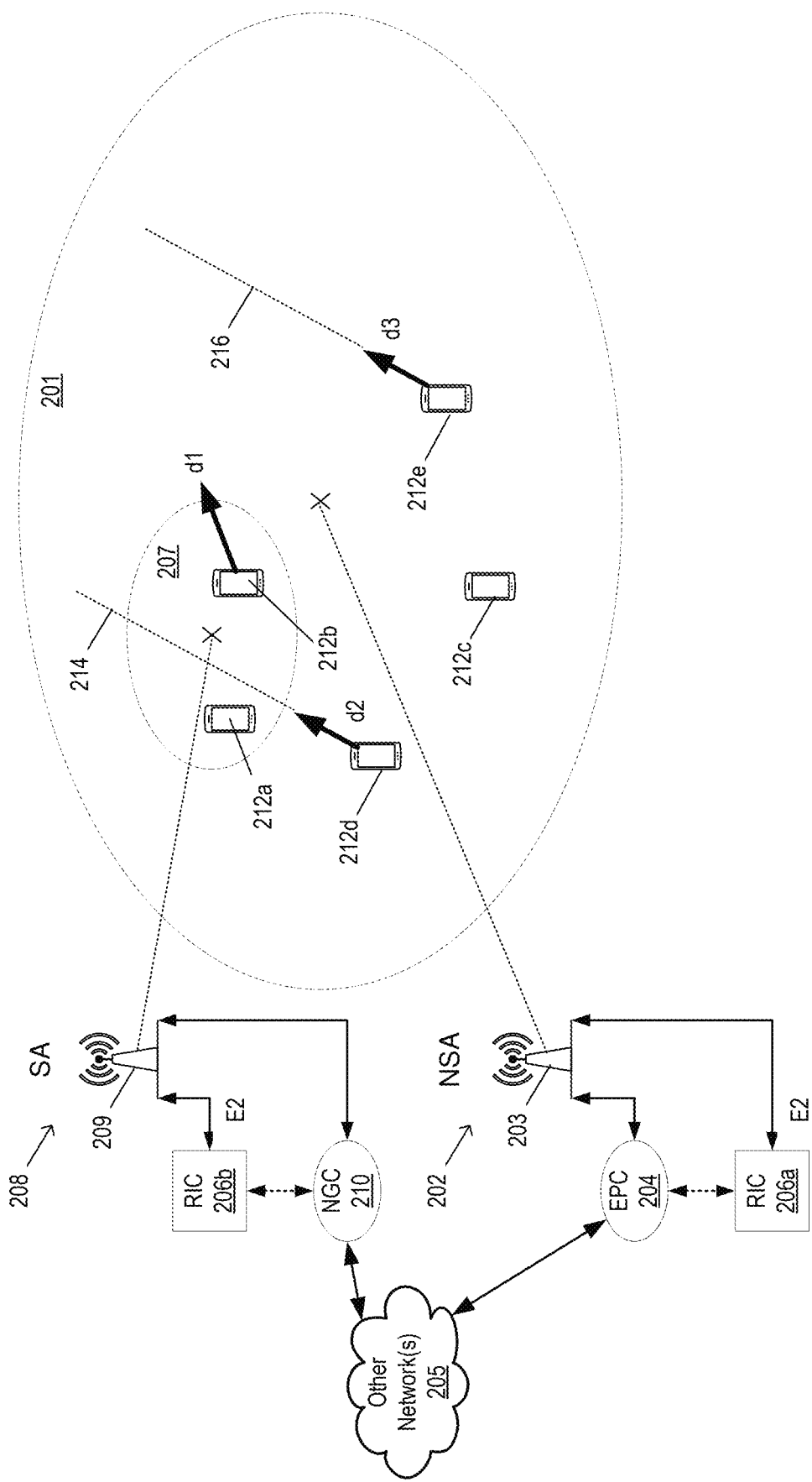
FIG. 2A is a block diagram illustrating an example, non-limiting embodiment of a dynamic radio access network (RAN) management system functioning within the communication network of FIG. 1 in accordance with various aspects described herein.

FIG. 2A is a block diagram illustrating an example, non-limiting embodiment of a dynamic radio access network (RAN) management system 200 functioning within the system 100 of FIG. 1, in accordance with various aspects described herein. The dynamic RAN management system 200 includes a first wireless coverage region, e.g., a first cell 201, that is established and served by a corresponding wireless access terminal, e.g., a first base station 203. The first base station 203 is adapted to provide wireless services to one or more mobile devices 212a. 212b, 212c, 212d, 212e, generally 212, according to a first mobile cellular architecture 202. Without limitation, the first mobile cellular architecture 202 may include a 5G NSA, in which scenario, the one or more mobile devices 212 may access first services, e.g., LTE and/or 4G-enabled services over a 5G NR enabled wireless channel. The first base station 203 is in communication with a first core network, e.g., an LTE evolved packet core (EPC) 204, which may be in further communication with one or more other networks 205 to facilitate delivery of the first wireless services to the one or more wireless devices 212. According to the NSA configuration, the first base station 203 coordinates control signaling according to LTE and/or 4G signaling via the EPC 204.

The dynamic RAN management system 200 also includes a second wireless coverage region, e.g., a second cell 207, that is established and served by a corresponding wireless access terminal, e.g., a second base station 209. The second base station 209 is adapted to provide wireless services to one or more mobile devices 212 according to a second mobile cellular architecture 208. Without limitation, the second mobile cellular architecture 208 may include a 5G SA, in which scenario, the one or more mobile devices 212 may access second services, e.g., 5G-enabled services over a 5G NR enabled wireless channel. The second base station 209 is in communication with a second core network, e.g., a 5G next generation core (NGC) 210, which may be in further communication with the one or more other networks 205 to facilitate delivery of the second wireless services to the one or more wireless devices 212. According to the SA configuration, the second base station 209 coordinates control signaling according to 5G signaling via the NGC 210.

According to the illustrative example, the first base station 203 is in communication with a first radio intelligent controller 206a and the second base station 209 is in communication with a second radio intelligent controller 206b. The example first and second radio intelligent controllers 206a. 206b, generally 206, are adapted to collect and/or otherwise monitor status and/or conditions of one or more of the mobile devices 212. The radio intelligent controllers 206 may be further adapted to identify a recommended and/or otherwise preferred mobile cellular architecture for one or more of the mobile devices 212. In at least some embodiments, the radio intelligent controllers 206 may be adapted to identify a preferred mobile cellular architecture for the one or more mobile devices 212 based at least in part on a monitored status and/or conditions of the mobile devices 212.

The radio intelligent controllers 206, in turn, may provide a recommendation to one or more of a corresponding base station 203, 209, e.g., via a message according to an E2 interface and/or to one or more of the EPC 204 and/or the NGC 210, responsive to an identification of a recommended and/or preferred mobile cellular architecture. In at least some embodiments, the corresponding base station 203, 209 and/or the EPC 204, NGC 210, may initiate a mobility action that may be adapted change a mobility state of at least one of the mobile devices 212 based on the recommendation. To the extent that a recommended mobile cellular architecture, e.g., one of the first and second mobile cellular architectures 202, 208, corresponds to a currently employed architecture for the corresponding device 212, it is understood that a corresponding mobility action may not be required, as there would be no need to change the mobility state, i.e., already connected according to the recommended mobile cellular architecture e.g., a recommended one of the first and second mobile cellular architectures 202, 208.

Figure 2B:
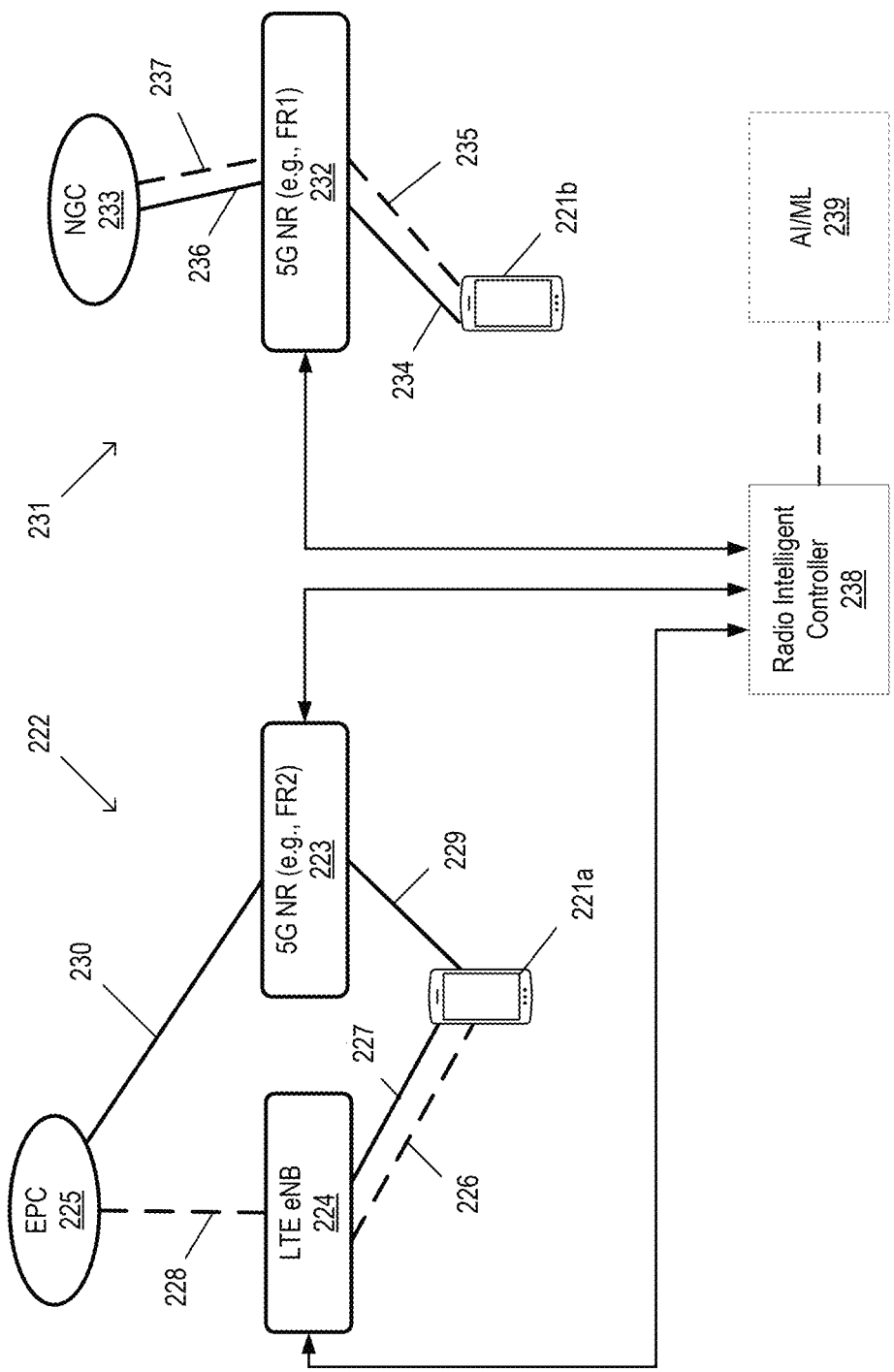
FIG. 2B is a more detailed block diagram illustrating an example, non-limiting embodiment of a dynamic RAN management system of FIG. 2A, functioning within the communication network of FIG. 1 in accordance with various aspects described herein.

FIG. 2B is a more detailed block diagram illustrating an example, non-limiting embodiment of a dynamic RAN management system 220, such as the dynamic RAN management system 200 of FIG. 2A, functioning within the system 100 of FIG. 1 in accordance with various aspects described herein. According to the illustrative example, the dynamic RAN management system 220 includes a first mobile cellular architecture, e.g., a 5G NSA architecture 222, facilitating a delivery of a first wireless service to a first mobile device 221a, and a second mobile cellular architecture, e.g., a 5G SA architecture 231, facilitating a delivery of a second wireless service to a second mobile device 221b. The wireless services may include, without limitation, any of the example services disclosed herein and/or otherwise known to be used in association with mobile cellular communications, such as messaging services, file transfer services voice services, video services, streaming media services, web-browsing services, automation services, e.g., home automation, security and/or surveillance services, and so on.

It is understood that at least some wireless services may require a particular mobile cellular architecture. For example, a wireless service that provides and/or otherwise relies upon network slicing may require a mobile network architecture, such as 5G SA that supports network slicing. In at least some instances, a wireless service that is available using one mobile cellular architecture may not be supported by and therefore available to mobile devices 221 receiving wireless services via a non-compliant mobile cellular architecture. Continuing with the network slicing example, a wireless service that requires network slicing would not be available to a mobile device receiving service via the 5G NSA architecture.

According to the illustrative example, the 5G NSA architecture 222 includes a 5G NR base station 223 and an LTE eNB base station 224, that operate collaboratively to deliver a wireless service to the first mobile device 221a. Namely, the 5G NR base station 223 provides NR features, allowing the first mobile device 221a to benefit from access to 5G features related to available spectrum, bandwidth, bandwidth efficiencies, and the like. According to the illustrative example, the 5G NR base station 223 provides cellular coverage, e.g., in a region of the first cell 201 (FIG. 2A) in 5G frequency range FR2. According to the first mobile cellular architecture, e.g., the 5G NSA architecture 222, user data may be exchanged over an air interface between the first mobile device 221a and the 5G NR base station 223 via a 5G user plane 229 and/or between the first mobile device 221a and the LTE eNB base station 224 via a 4G/LTE data plane 227. In either scenario, any related control signaling would be limited to the LTE eNB base station 224, e.g., via a 4G/LTE control plane 226. Control signaling may be further exchanged between the LTE eNB base station 224 and the EPC 225 via an extension of the control plane 228.

According to the illustrative example, the 5G SA architecture 231 includes a 5G NR base station 223 that operate to deliver a wireless service to the second mobile device 221b, without requiring any legacy network equipment and/or protocols. Namely, the 5G NR base station 232 provides all aspects of 5G wireless communications, including NR features, allowing the first mobile device 221a to benefit from access to 5G features related to available spectrum, bandwidth, bandwidth efficiencies, and the like. According to the illustrative example, the 5G NR base station 232 provides cellular coverage, e.g., in a region of the second cell 207 (FIG. 2A) in 5G frequency range FR1. According to the first mobile cellular architecture 231, user data may be exchanged over an air interface between the second mobile device 221b and the 5G NR base station 232 via a 5G user plane 234, while control signaling may be exchanged over the same air interface via a 5G control plane 235. The 5G NR base station 232 may be in further communication with a 5G NGC 233, without requiring support from any legacy, e.g., LTE and/or 4G equipment.

It may be appreciated that provisioning of services via the NSA and SA mobile cellular architectures 222, 231 may depend upon one or more various factors and/or conditions. First, it is understood that a mobile device 221 may be equipped with one or more radios and/or one or more wireless protocols. Accordingly, access to a wireless service according to the NSA and/or SA mobile cellular architectures 222, 231 may depend at least in part on a capability of the mobile device 221. Other conditions of the mobile device 221 that may affect mobile device 221 access to wireless services according to either of the NSA and SA architectures 222, 231 may include a location of the mobile device 221, e.g., within a particular cell, and/or at or near a cell edge, whether the mobile device 221 is mobile or stationary, if mobile, whether the mobile device is a fast or slow mover, e.g., whether the mobile device 221 may be in a vehicle versus in a hand of a user who may be walking. Still other conditions that may affect mobile device 221 access to wireless services according to either of the NSA and SA architectures 222, 231 may include a mobility inference determined according to an association of a device location with a related purpose, e.g., a location of a business, such as an office, a coffee shop and/or a library, in which an inference of low mobility may be made, versus a location of a shopping mall, a roadway, an airport in which an inference of mobility, including imminent mobility may be made.

Alternatively or in addition, certain wireless services and/or the mobile cellular architectures 222, 231 themselves may require some threshold level of condition, such as a minimum receives signal strength on an uplink and/or downlink channel to the mobile device 221. Still other conditions that may affect mobile device 221 access to wireless services according to either of the NSA and SA architectures 222, 231 may include an availability of licensed and/or unlicensed spectrum within a given cell and/or region, one or more network traffic conditions, e.g., congestion, signal and interference to noise ratios (SINR), quality of service (QoS) requirements, current conditions, past conditions, and/or projected future conditions of any of the conditions upon which a selection of an appropriate mobile cellular architecture 222, 231 may be made.

In at least some embodiments, the dynamic RAN management system 200 may include one or more RAN controllers. The example dynamic RAN management system 200 includes a single radio intelligent controller 238 in communication with one or more of the example base stations 223, 224, 232. The radio intelligent controller 238 may receive information related to the mobile device 221, such as its device type, its equipment identification, user association, home mobile network operator, subscribed services. Alternatively or in addition, the radio intelligent controller 238 may receive information related to a status or condition of mobile device 221, such as its location as may be reported by a mobile network operator and/or by the device according to an onboard GPS receiver, mobility information, channel conditions, RF signal strengths, QoS, currently active services and/or applications, historical records of any of the foregoing for the particular mobile device 221, an associated user of the mobile device 221 and/or a class of similar device and/or users, and the like. In at least some embodiments the radio intelligent controller 238 may receive inputs from one or more of the base stations 223, 224, 232, the EPC 225, the NGC 233 and/or other network accessible devices.

In at least some embodiments, the radio intelligent controller 238 may be adapted to select and/or otherwise recommend one of a number of different mobile cellular architectures, such as the example 5G NSA architecture 222 and 5G SA architecture 231, to facilitate wireless services to a mobile device 221. The radio intelligent controller 238 may determine a recommendation based on one or more of a condition and/or status of the mobile device 221, the RAN, e.g., the base station 223, 224, 232 and/or related wireless channel conditions, a subscriber level of subscription. The radio intelligent controller 238 may receive one or more messages, e.g., from one or more of the mobile device 221, the base station 223, 224, 232, the EPC 225, the NGC 233, a backend server or system (not shown) and the like. The one or more messages may identify any of the foregoing example conditions and/or status indicators. The radio intelligent controller 238 may apply one or more rules and/or policies and/or logic based on the conditions and/or status indicators to obtain a recommended mobile cellular architecture 222, 231.

In some embodiments, the radio intelligent controller 238 may be incorporated into one or more of a remote radio head, a radio control unit, a standalone equipment cabinet proximal to other radio equipment, at a datacenter, e.g., collocated with one or more of the base stations 223, 224, 232, and/or at some other network accessible location. It is envisioned that one radio intelligent controller 238 may be dedicated to a particular cell, e.g., a first radio intelligent controller servicing the first mobile device 221*a* via the first collaborative 5G NSA base stations 223, 224, and a second radio intelligent controller servicing the second mobile device 212*b* via the 5G SA NGC base station 232.

It is envisioned that in at least some embodiments, the radio intelligent controller 238 may incorporate aspects of artificial intelligence (AI) and/or machine learning (ML), such as the example AI/ML module 239. In at least some embodiments, the AI/ML module 239 may incorporate one or more neural networks, such as deep neural networks adapted to facilitate recommendations of different types of mobile cellular architectures according to any of the various conditions and/or status indicators as may be obtained by the radio intelligent controller 238. In this regard, a neural network of the AI/ML module 239 may be trained according to one or more training data sets in which various combinations of conditions and/or status indicators are associated with predetermined suitable mobile cellular architecture recommendations. In at least some embodiments, training of any machine learning algorithms, such as the example neural networks, may be extended and/or otherwise supplemented with actual conditions, status indicators and/or recommendations in combination with feedback as to whether the recommendations were appropriate and/or otherwise successful. Without limitation, feedback may be obtained via supplemental measurements, e.g., QoS, signal strength, SINR, dropped calls, broken connections, network latency, error performance, and the like. Alternatively or in addition, feedback may be obtained via mobile network operator reports as may provide statistical information on past performance and/or by user reported feedback as may be obtained via user surveys, service call reports, and the like.

The mobile devices 221*a*, 221*b*, generally 221, may include any device enabled for wireless communications, including any of the example devices disclosed herein and/or otherwise known to be used in association with mobile cellular communications, such as such as mobile phones, tablet devices, personal computers, and the like. Alternatively or in addition, at least some of the mobile devices 221 may include, without limitation, vehicles, e.g., self-driving cars, robots, drones, and/or other devices enabled for machine-type communications, e.g., home appliances, security systems, surveillance cameras, lighting, climate control, access devices, e.g., door locks, garage doors, home appliances, e.g., refrigerators, dishwashers, washing machines, and so on.

Figure 2C:
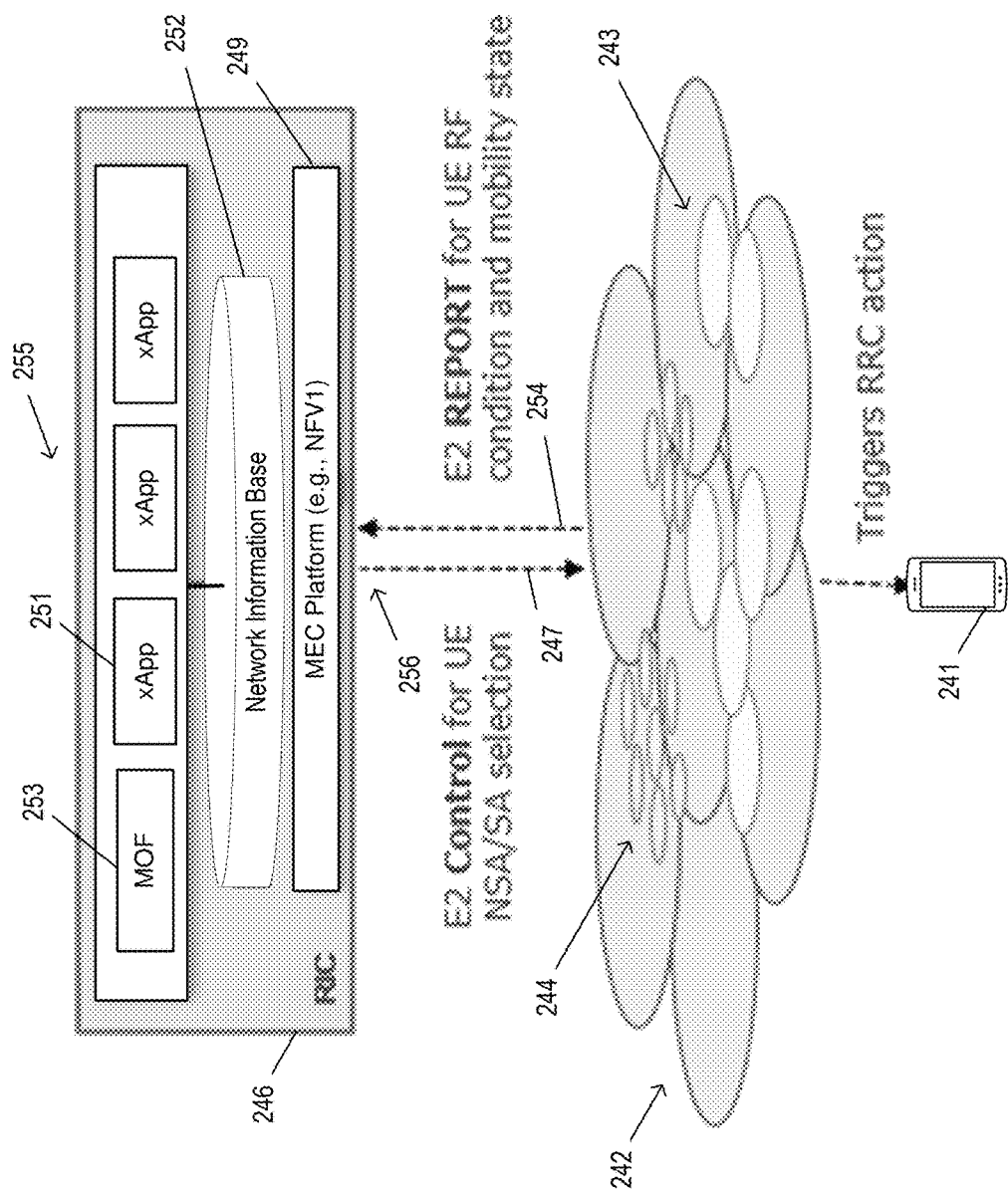
FIG. 2C is a block diagram illustrating an example, non-limiting embodiment of a dynamic RAN management system functioning within the communication network of FIG. 1 in accordance with various aspects described herein.

FIG. 2C is a block diagram illustrating an example, non-limiting embodiment of a dynamic RAN management system 240 functioning within the system 100 of FIG. 1 in accordance with various aspects described herein. According to the illustrative example, wireless cellular communications coverage is provided to a geographic region via a number of cells. The cells may be adjacent, and in at least some instances, overlapping. Likewise, the cells may have different ranges based on one or more of an operational frequency range, RF power restrictions, RF propagation obstructions, and the like. The cells of the illustrative example are shown as ellipses for convenience, understanding that the shape may vary according to any of the foregoing example reasons and/or according to a designed sectorization of coverage, restricting coverage to less than 360 degrees in azimuth. In particular, the example includes a first set of seven, mostly adjacent and relatively large cells 242.

Superimposed over the set of relatively large cells 242 are a first group of medium-sized cells 243 and a second group of relatively small cells 244. By way of example, the relatively large cells may correspond to 4G/LTE cells, while the medium-sized cells 243 may correspond to 5G mid-band cells and the relatively small cells 244 correspond to 5G high-speed, millimeter range cells. It is generally understood that a range of an RF link, as it may relate to a size of a cell's coverage map, may vary inversely with frequency. That is, operation at lower frequencies, such as LTE and/or 5G low band, may support relatively large cells, whereas operation at higher frequencies tends to result in decreasing cell size, with the smallest cells associated with the millimeter wavelength operations.

Continuing with the illustrative example, a mobile device, i.e., a mobile phone 241, is located within a reliable wireless communication range of one or more of the various groups of cells 242, 243, 244. Also shown is an example radio intelligent controller 246. An E2 report 254 for the mobile phone 241 is provided to the radio intelligent controller 246 by the mobile phone 241 and/or by one or more cells of the example groups of cells 242, 243, 244. The example E2 report 254 identifies one or more conditions and/or a mobility state of the mobile phone 241. The radio intelligent controller 246 formulates a recommendation for a preferred one of a set of different available mobile cellular architectures, the preferred one to be selected and/or otherwise directed for provisioning of wireless services to the mobile phone 241 responsive to at least a portion of information provided in the E2 report 254.

A selection and/or recommendation determined by the radio intelligent controller 246 may be provided to a recipient cell of the example groups of cells 242, 243, 244, and/or to the mobile phone 241 via an E2 control message and/or command 247. The recommendation, in turn, may initiate a process at the recipient cell of the example group of cells 242, 243, 244 triggers a radio resource control (RRC) action, e.g., according to a 5G network-controlled and/or otherwise initiated handover according to the recommendation. The RRC action may facilitate a connection and/or attachment of the mobile phone 241 to a recommended one of the cells of the group of cells 242, 243, 244. Alternatively or in addition, the RRC action may initiate a transfer of the mobile phone 241 from one cell to the recommended one of the cells of the group of cells 242, 243, 244, e.g., according to a 5G user equipment (UE)-controlled and/or otherwise initiated handover according to the recommendation.

In more detail, the radio intelligent controller 246 may be adapted to facilitate and/or otherwise enable eNB/gNB functionalities as xApps 251 on northbound interfaces 255. Applications like mobility management, admission control, and interference management may be provided as apps on the controller 246, which may enforce network policies via a southbound interface 256 toward the mobile phone 241. The radio intelligent controller may provide advanced control functionality adapted to deliver increased efficiency and better radio resource management. In at least some embodiments, such control functionalities may leverage analytics and data-driven approaches including advanced AI/ML tools to improve resource management capabilities.

The xApps 251 are software tools used by a radio intelligent controller 246 to manage network functions in near-real time. In at least some embodiments, the xApps 251 may be incorporated as part of the radio intelligent controller 246. The northbound interface 255 may include an interface that allows a particular component of a network to communicate with a higher-level component, while the southbound interface 256 allows a particular network component to communicate with a lower-level component. It is understood that one or more of the technical features disclosed herein, such as selection and/or recommendation of a particular cell and/or a preferred mobile cellular architecture may be implemented within the radio intelligent controller 246, e.g., as a mobility optimization function (MOF) 253. In at least some embodiments, the MOF 253 may be implemented as one of the xApps 251.

The example radio intelligent controller 246 also includes multi-access edge computing (MEC) module 249. The MEC module 249 may be adapted to facilitate movement of computing, e.g., network traffic processing, and/or services from a centralized cloud to an edge of the network, places such processing closer to the customer. In at least some embodiments the MEC module 249 may offer cloud-computing capabilities and an information technology service environment at an edge of the network. For example, a software-defined access layer may be used as an extension of a distributed cloud. Thus, instead of sending all data to a cloud for processing, the MEC module 249 located at a network edge analyzes, processes, and/or stores corresponding data, without having to transport at least some of the corresponding data elsewhere, e.g., through a mobile core network. It is understood that collecting and processing data closer to the customer reduces latency and brings real-time performance to high-bandwidth applications.

According to the illustrative example, the radio intelligent controller 246 also includes a network information base (NIB) 252. The NIB 252 may describe a network graph, e.g., that is built by a controller, e.g., using OpenFlow and other methods to build unified view of network topology. Generally, the NIB 252 may support operations of one or more of the xApps 251. In at least some embodiments, the NIB 252 supports operations of the MOF 253.

In at least some embodiments, the radio intelligent controller 246 selects one of an NSA mode or an SA mode for the mobile phone 241 based on one or more of its coverage condition, its mobility state, a requested and/or otherwise desired 5G services, and/or NR carrier availability. Accordingly, the dynamic RAN management system 240 dynamically selects a preferred one of the NSA or SA mobile cellular architectures based on a radio intelligent mobility optimization function (MOF) architecture. The techniques disclose hereon lay a foundation for intelligent network automation and optimization to ensure that mobile cellular equipment and/or subscribers receive the best available network services to ensure a positive user experience.

Figure 2D:
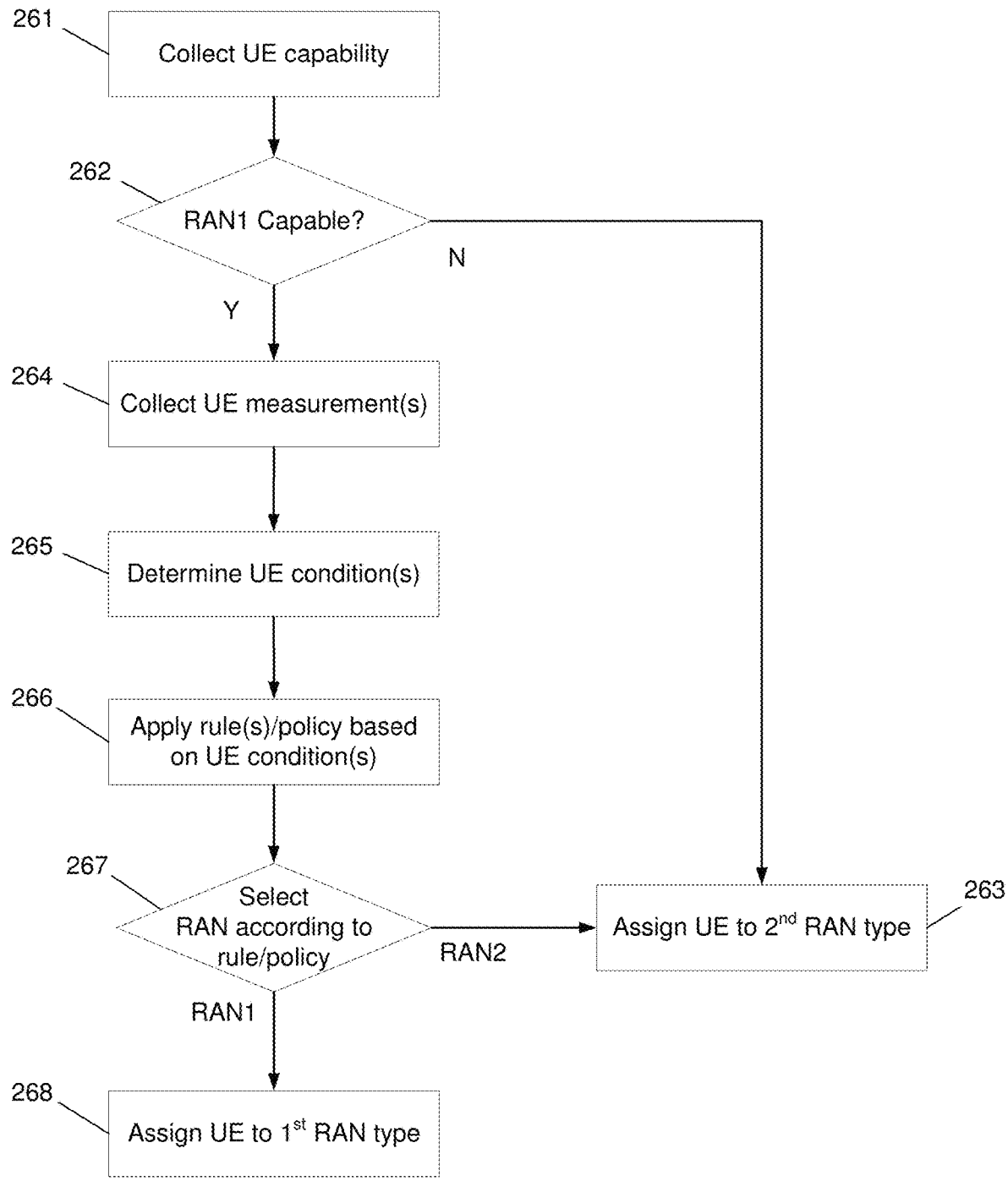
FIG. 2D depicts an illustrative embodiment of a dynamic RAN management process in accordance with various aspects described herein.

FIG. 2D depicts an illustrative embodiment of a dynamic RAN management process 260 in accordance with various aspects described herein. The process 260 includes collecting a capability of a mobile device, e.g., UE, at 261. The capability may include one or more of a mobile device make and/or model, onboard radio type(s), a bandwidth, a frequency band of operation, one or more wireless mobile standards supported by the UE, e.g., a mobile device operating system, whether the mobile device UE is 5G capable, and the like. Alternatively or in addition, the process 260 may collect one or more of a home mobile network operator of the mobile device, a subscriber identity, a subscription level, an authorization, and so on.

Determining at 262 whether the mobile device is capable of operating according to a first type of RAN, e.g., operating according to a first mobile cellular architecture. RAN types may include RAN characterizations and/or qualifications according to any applicable mobile communication standards, e.g., LTE/4G, 5G-NR, 5G and so on. In at least some embodiments, RAN types may include operating frequencies, operating frequency bands, operating bandwidths, modulation types, error correction coding, and the like.

Responsive to determining at 262 that the UE is not capable of using the first RAN, selecting wireless service provisioning to a second RAN at 263. For example, the second RAN may include a RAN operating according to one or more of a different mobile cellular architecture, a different operating frequency, a different operating frequency band, a different operating bandwidth, a different module type, a different error correction coding, and the like. In at least some embodiments, selection of the second RAN at 263 may be preceded by a step of identifying the second RAN (not shown). A second RAN may be identified as a RAN type of which the mobile device has used in the past and/or a RAN type which may be determined to be otherwise compatible with the mobile device.

In at least some embodiments, the second RAN type corresponds to an available second RAN type that presents a viable option for supporting provisioning of a wireless service to the mobile device. Such second RAN types may provide overlapping coverage, such as overlapping regions of the different groups of cell types 242, 243, 244 (FIG. 2C). It is envisioned that in at least some scenarios, a mobile device that is incapable of using the first type of RAN may not have a viable option for a second type of RAN, e.g., no overlapping coverage of first and second RAN types. In such instances, the radio intelligent controller and/or a mobile network operator may revert mobile communications to a legacy mode, e.g., 3G. Alternatively or in addition, the mobile device may be presented with a message, e.g., an error message, indicating that the first RAN type is not supported and no viable second RAN types are presently available. In at least some embodiments, the mobile device may be presented with a message directing the mobile device to a nearby location, to the extent one exists, at which a suitable second RAN type is available. Alternatively or in addition, the mobile device may be presented with a message indicating a user action, e.g., a change in subscription level, an authorization, and the like, which may be enacted at the mobile device to enable the mobile device for operation with an otherwise inaccessible, yet available second RAN type.

Responsive to determining at 262 that the UE is capable of using the first RAN, collecting UE measurements at 264. Measurements may include one or more of any of the various types of measurements disclosed herein and/or otherwise known by those skilled in the art of mobile communications. The measurements may be collected by the mobile device under evaluation for which the UE capability was collected. Alternatively or in addition, the measurements may be collected by another mobile device or group of devices, e.g., representative of wireless channel conditions, network traffic conditions, line-of-sight conditions, and so on, that may be relevant to operation of the mobile device under evaluation. In at least some embodiments, one or more of the measurements may be obtained from a base station and/or other elements of the radio access network, the core network, or any other network accessible device, such as a back-end server, e.g., a measurement database, as may be employed to monitor and/or store relevant UE, network and/or channel measurements.

Determining one or more UE condition(s) and/or UE state(s) at 265. A state and/or condition of the UE under investigation may be determined according to one or more of the measurements obtained at 264. The condition and/or state may relate to a signal strength, an error metric, a battery level, an available bandwidth, a processing capacity, a selected and/or otherwise desired application, and so on.

According to the example process 260, one or more rule(s) and/or policy-based decision(s) may be applied at 266 according to the UE condition(s) and/or state(s). The rules and/or policy-based decisions may apply preprogrammed process steps and/or logic to identify a suitable RAN type. Suitability may be based on technical aspects, such as an expected tolerable error performance according to measurements, anticipated user activity, e.g., based on past performance, a current mobile device location, a selected application, a past history of selected applications, network availability, competing needs with other mobile devices, economic decisions, e.g., adapted to maximize mobile network operator revenues, to preserve operability, to minimize maintenance actions, to reserve anticipated capacity requirements and so on.

A mobile cellular architecture may be selected at 267. In at least some embodiments, the selection is based solely on application of the one or more rule(s) and/or policy-based decision(s) applied at 264. Alternatively or in addition, selection of the mobile cellular architecture may be based at least in part upon another condition, such as a user choice, a mobile network operator choice, a random selection, e.g., among completing users of equal stature, and so on.

Referring back to FIG. 2A, a first stationary mobile device is positioned within the second cell 207, which overlaps the first cell 201. Based on the mobility, or lack thereof, and its presence within the overlapping coverage, the radio intelligent controller 206 may make a recommendation that triggers an RRC action, e.g., to migrate a first mobile device 212a from the first cell 201 to the second cell 207. Alternatively or in addition, the triggered RRC action may migrate mobile support of the first mobile device 212a from a first mobile cellular architecture, e.g., 4G/LTE to a second mobile cellular architecture, e.g., 5G-SA, or 5G-NSA, as the case may be.

The radio intelligent controller 206 may not provide a similar recommendation for a second mobile device 212b that also lies within the overlapping coverage of the first and second cells 201, 207, based on mobility of the second mobile device 212b. Namely, the second device is moving along a trajectory indicated by the arrow, which will ultimately result in the second mobile device being without coverage of the second cell 207. In at least some embodiments, the radio intelligent controller, by application of the one or more rule(s) and/or policy decision(s) may determine an estimated duration of time that the second mobile device 212b will remain in overlapping coverage and weigh that against an intended application. To the extent that a meaningful support may be provided during the determined overlap time, the radio intelligent controller may trigger an RRC to migrate operation of the second mobile device 212b to the second cell 207, even though there may be a limited duration. Otherwise, any such migration may be blocked and/or an RRC action triggered to migrate operation of the second mobile device 212b from the second cell 207 to the first cell 201.

In yet another scenario, a third mobile device 212d is located within a coverage region of the first cell only. However, the third mobile device 212d is moving along an indicated trajectory 214 that will ultimately intersect an overlapping region of coverage. In at least some embodiments, the radio intelligent controller may anticipate future opportunity at which time it may be advantageous to activate and/or otherwise transition of a wireless service from the first cell 201 to the second cell 203. The radio intelligent controller may initiate a gathering of measurements as they may relate to a condition and/or state of the UE in anticipation for making a future decision regarding a preferred RAN type and/or a preferred mobile cellular architecture. In at least some embodiments, a decision may ultimately be made by the radio intelligent controller in advance of the third mobile device entering the region of overlapping coverage. In such instances, a corresponding RRC action may be triggered when the device reports its location and/or is otherwise detected, e.g., by the base station 209, as being within the overlapping coverage region.

Other mobile devices include fourth and fifth mobile devices 212c, 212e that are located within a coverage region of the first cell 201 only. The fourth mobile device 212c is stationary, and the fifth mobile device 212e is mobile along the indicated trajectory 216. The indicated trajectory does not intersect an area of overlapping coverage with the second cell 207. Accordingly, the radio intelligent controller may identify the fourth and fifth mobile devices 212c, 212e as non-candidate devices. In at least some embodiments, the radio intelligent controller may terminate and/or elect not to collect measurements related to a condition and/or state of either of the further or fifth mobile devices 212c, 212e.

To the extent a first type of mobile cellular architecture is selected at 267, assign the UE to the first type of mobile cellular architecture at 268. To the extent a second type of mobile cellular architecture is selected at 267, assign the UE to the second type of mobile cellular architecture at 263. Assignment of the UE to the first or second type of mobile cellular architecture, as the case may be, may trigger a radio resource control (RRC) action. The particular RRC action may depend upon a present state of the UE, e.g., the UE is in an idle state, or may be engaged in one or more other applications. Selection may be initiated by the UE, by a base station and/or by a combination thereof.

While for purposes of simplicity of explanation, the respective processes 260 is shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of systems 200, 220, 240 and process 260 presented in FIGS. 1, 2A, 2B, 2C, 2D and 3. For example, virtualized communication network 300 can facilitate in whole or in part, determining a capability of a mobile device, collecting a mobile station measurement, applying a rule according to the capability and measurement to obtain a radio access network (RAN) recommendation that identifies one of a first or second RANs as a preferred RAN, wherein a service is provided to the device via the preferred RAN. The first RAN comprises a first base station that supports a first exchange of user data and corresponding control signaling to facilitate access to a first set of services. The second RAN comprises a second base station adapted to support a second exchange of user data and a third base station adapted to support a corresponding exchange of control signaling to facilitate access to a second set of services. The second RAN is unable to facilitate access to the first set of services.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

According to the illustrative embodiment, the virtualized communication network 300 may include a first radio intelligent controller 380 in communication with the virtualized network function cloud 325. The example wireless access 120 may include at least a portion of a second radio intelligent controller 381 that may be operated alone or in combination with the first radio intelligent controller 380. In at least some embodiments all or at least a portion of functionality of the first radio intelligent controller 380, the second radio intelligent controller 380 or both may be implemented according to virtualization.

Figure 4:
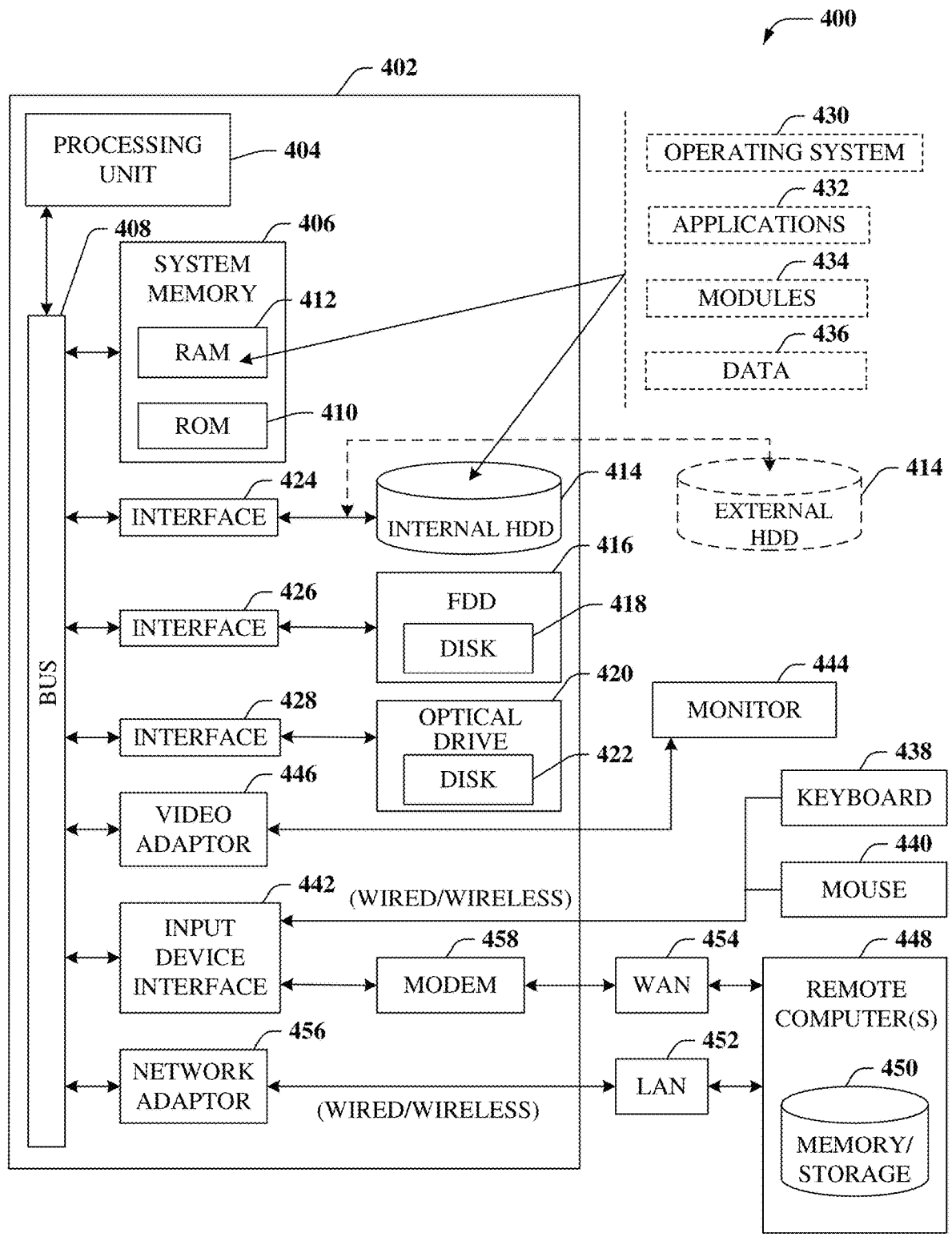
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part, determining a capability of a mobile device, collecting a mobile station measurement, applying a rule according to the capability and measurement to obtain a radio access network (RAN) recommendation that identifies one of a first or second RANs as a preferred RAN, wherein a service is provided to the device via the preferred RAN. The first RAN comprises a first base station that supports a first exchange of user data and corresponding control signaling to facilitate access to a first set of services. The second RAN comprises a second base station adapted to support a second exchange of user data and a third base station adapted to support a corresponding exchange of control signaling to facilitate access to a second set of services. The second RAN is unable to facilitate access to the first set of services.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
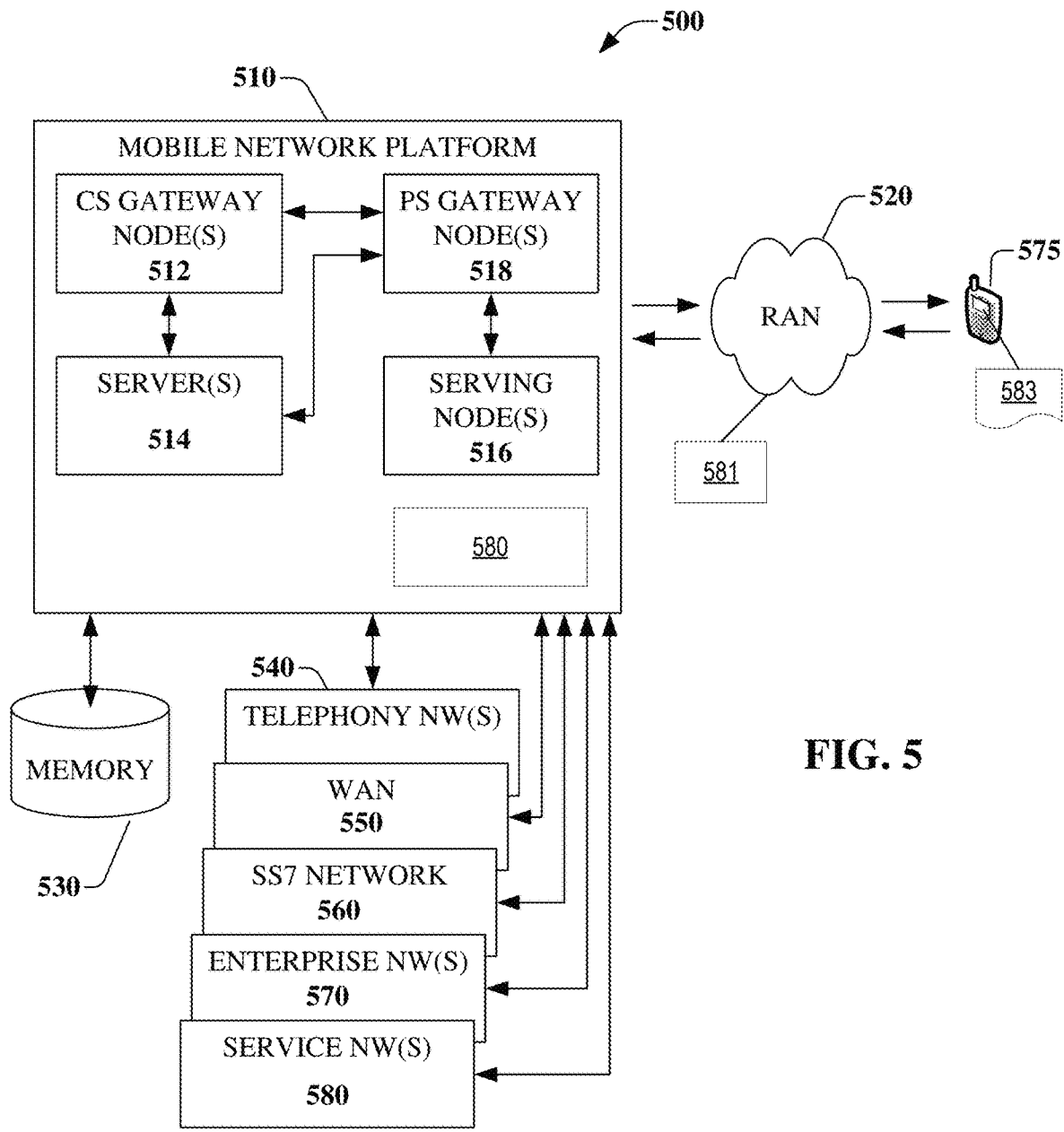
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part, determining a capability of a mobile device, collecting a mobile station measurement, applying a rule according to the capability and measurement to obtain a radio access network (RAN) recommendation that identifies one of a first or second RANs as a preferred RAN, wherein a service is provided to the device via the preferred RAN. The first RAN comprises a first base station that supports a first exchange of user data and corresponding control signaling to facilitate access to a first set of services. The second RAN comprises a second base station adapted to support a second exchange of user data and a third base station adapted to support a corresponding exchange of control signaling to facilitate access to a second set of services. The second RAN is unable to facilitate access to the first set of services. In one or more embodiments, the mobile network platform 510 can generate and receive signals transmitted and received by base stations or access points such as first and second base stations or access points 122a, 122b, generally 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

According to the illustrative embodiment, the example mobile network platform network 510 may include a first radio intelligent controller 580 in communication adapted to implement one or more of the various features disclosed herein, e.g., in selecting a suitable mobile cellular architecture and/or RAN type. The example RAN 520 may include at least a portion of a second radio intelligent controller 581 that may be operated alone or in combination with the first radio intelligent controller 580. In at least some embodiments all or at least a portion of functionality of the first radio intelligent controller 580, the second radio intelligent controller 581 or both may be implemented according to virtualization. It is envisioned that in at least some embodiments, the radiotelephone 575 may include one or more functions 583, e.g., implemented as apps and/or within a mobile operating system, which may work in support of the various techniques disclosed herein. For example, the function(s) 583 may collect UE one or more condition(s) and/or state(s) as may be required by the radio intelligent controller 580 to support its application of the example rule(s) and/or policy decision(s).

Figure 6:
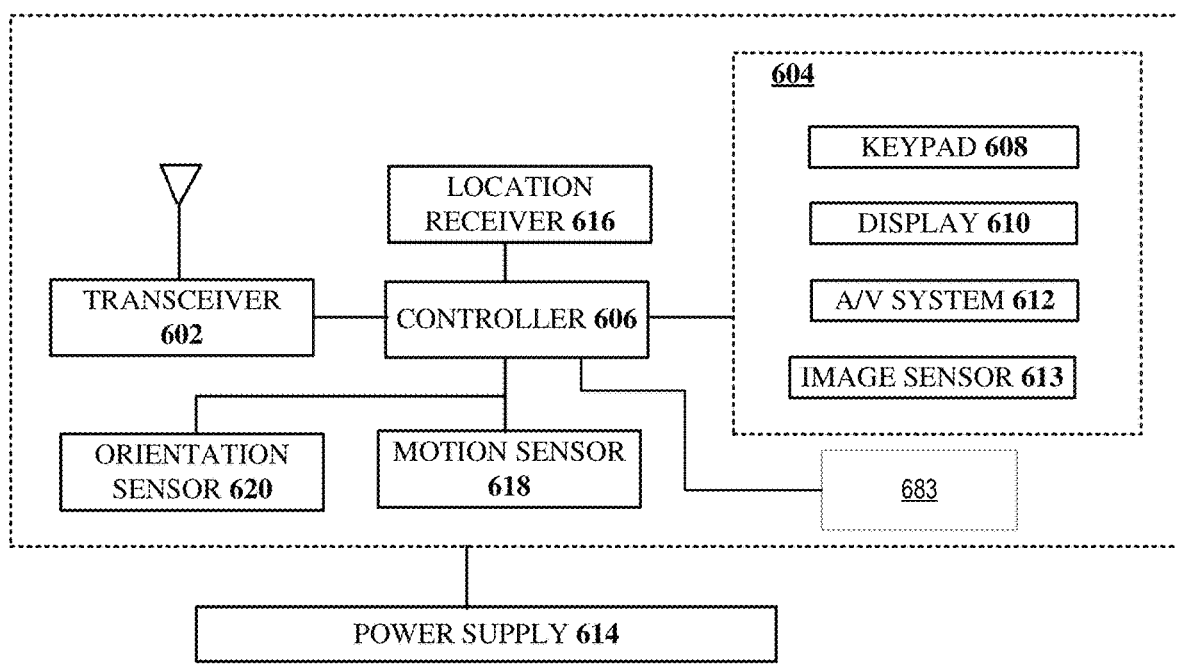
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part, determining a capability of a mobile device, collecting a mobile station measurement, applying a rule according to the capability and measurement to obtain a radio access network (RAN) recommendation that identifies one of a first or second RANs as a preferred RAN, wherein a service is provided to the device via the preferred RAN. The first RAN comprises a first base station that supports a first exchange of user data and corresponding control signaling to facilitate access to a first set of services. The second RAN comprises a second base station adapted to support a second exchange of user data and a third base station adapted to support a corresponding exchange of control signaling to facilitate access to a second set of services. The second RAN is unable to facilitate access to the first set of services.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

It is envisioned that in at least some embodiments, the communication device 600 may include one or more functions 683, e.g., implemented as apps and/or within a mobile operating system, which may work in support of the various techniques disclosed herein. For example, the function(s) 683 may collect one or more UE condition(s) and/or state(s) as may be required by a radio intelligent controller 580 (FIG. 5) to support its application of the example rule(s) and/or policy decision(s) disclosed herein.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage." "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4 . . . xn), to a confidence that the input belongs to a class, that is, $f(x)$= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component." "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station." "access terminal," "terminal," "handset." "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
    a processing system including a processor; and
    a memory that stores executable instructions that, when executed by the processing system, facilitate performance of operations, the operations comprising:
        identifying a capability of a mobile station;
        collecting at least one measurement obtained via the mobile station, wherein the at least one measurement comprises a speed of the mobile station as a mobility state of the mobile station;
        determining an operational condition of the mobile station according to the at least one measurement;
        estimating a required wireless channel capacity of a mobile station requested service;
        determining a radio access network (RAN) type recommendation according to a rule application that is based upon the capability, the operational condition and the required wireless channel capacity, wherein the determining the RAN type recommendation according to the rule application comprises an artificial intelligence (AI) process that has been trained according to one or more training data sets, wherein the RAN type recommendation is for one of a first RAN type or a second RAN type, wherein the first RAN type comprises a first base station adapted to support a first wireless exchange of first control signaling and first user data supported by the first control signaling between the first base station and the mobile station to facilitate mobile station access to a first set of mobile services comprising access to mobile edge computing regarding processing of the first user data, and wherein the second RAN type comprises a second base station adapted to support a second wireless exchange of second control signaling between the second base station and the mobile station, and a third base station adapted to support a third wireless exchange of second user data between the third base station and the mobile station supported by the second control signaling to facilitate mobile station access to a second set of mobile services, the second RAN type being unable to facilitate mobile station access to the first set of mobile services; and
        facilitating providing of service to the mobile station by one of the first RAN type and the second RAN type according to the RAN type recommendation.

2. The system of claim 1, wherein the first RAN type comprises a stand-alone architecture according to Third Generation Partnership Project (3GPP) fifth generation (5G) standards, wherein the first base station comprises a base station according to the 5G standards, and wherein the first wireless exchange of first control signaling and first user data comprise a control plane and a data plane of the 5G standards.

3. The system of claim 2, wherein the second RAN type comprises a non-stand-alone architecture according to the 5G standards, wherein the third base station is a base station according to 5G standards, wherein the second base station is a base station according to 3GPP Long Term Evolution (LTE) standards, wherein the second wireless exchange of second control signaling comprises a control plane of the LTE standards, and wherein the second user data comprises the data plane of the 5G standards.

4. The system of claim 2, wherein the first set of mobile services comprises one of network slicing, separation of the data plane from the control plane of the 5G standards, or any combination thereof.

5. The system of claim 1, wherein the first RAN type comprises a standalone architecture (SA) mode according to Third Generation Partnership Project (3GPP) fifth generation (5G) standards and wherein the second RAN type comprises a non-standalone architecture (NSA) mode according to the 5G standards.

6. The system of claim 1, wherein the identifying the capability of the mobile station further comprises:
    determining that the capability is a fifth generation (5G) capability according to Third Generation Partnership Project (3GPP) 5G standards.

7. The system of claim 1, wherein the at least one measurement obtained via the mobile station further comprises one of a signal strength of a wireless channel between the mobile station and one of the first, second and third base stations, a wireless coverage condition of one of the first, second and third base stations, availability of one of the first, second and third base stations, or any combination thereof.

8. The system of claim 1, wherein the mobility state further comprises one of a location of the mobile station, a direction of travel of the mobile station.

9. The system of claim 1, wherein the operations further comprises:
  determining a location condition indicating that the mobile station is located within or without a wireless coverage area of each of the first, second and third base stations;
  determining whether the first set of mobile services comprises the mobile station requested service; and
  identifying the first RAN responsive to the location condition indicating the mobile station is located within the wireless coverage area of the first, second and third base stations, and the first set of mobile services comprising the mobile station requested service.

10. The system of claim 9, wherein the operations further comprise:
  identifying the second RAN responsive to the location condition indicating the mobile station is not located within the wireless coverage area of the first base station.

11. The system of claim 9, wherein the operations further comprise:
  determining an available wireless channel capacity of the first base station, wherein the identifying the first RAN is further responsive to the available wireless channel capacity exceeding the required wireless channel capacity of the mobile station requested service.

12. The system of claim 1, wherein the operations further comprise:
  determining that the mobile station is attached to one of the first RAN type or the second RAN type; and
  sending a recommendation to one of the first, second and third base stations to select a different one of the first RAN type and the second RAN type according to the rule application.

13. A method, comprising:
  determining, by a processing system comprising a processor, a capability of a mobile station;
  collecting, by the processing system, at least one measurement corresponding to the mobile station, wherein the at least one measurement comprises a speed of the mobile station as a mobility state of the mobile station;
  estimating, by the processing system, a required wireless channel capacity of a mobile station requested service;
  determining, by the processing system, a radio access network (RAN) type recommendation that is based upon the capability, the at least one measurement and the required wireless channel capacity, wherein the determining the RAN type recommendation comprises an artificial intelligence (AI) process, wherein the AI process had previously been trained according to at least one training data set, wherein the RAN type recommendation is for one of a first RAN type or a second RAN type, wherein the first RAN type comprises a first base station adapted to support a first wireless exchange of first user data and corresponding first control signaling between the first base station and the mobile station to facilitate mobile station access to a first set of mobile services comprising access to mobile edge computing regarding processing of the first user data, and wherein the second RAN type comprises second and third base stations, the second base station adapted to support a second wireless exchange of second user data with the mobile station and the third base station adapted to support a corresponding wireless exchange of corresponding second control signaling with the mobile station to facilitate mobile station access to a second set of mobile services, the second RAN type being unable to facilitate mobile station access to the first set of mobile services; and
  facilitating, by the processing system, providing of service to the mobile station by one of the first RAN type and the second RAN type according to the RAN type recommendation.

14. The method of claim 13, wherein the first RAN type comprises a stand-alone architecture according to Third Generation Partnership Project (3GPP) fifth generation (5G) standards, wherein the first base station comprises a base station according to the 5G standards, and wherein the first wireless exchange of first user data and corresponding first control signaling comprises control and data planes of the 5G standards.

15. The method of claim 14, wherein the second RAN type comprises a non-stand-alone architecture according to the 5G standards, wherein the second base station is a base station according to the 5G standards, wherein the third base station is a base station according to 3GPP Long Term Evolution (LTE) standards, wherein the second wireless exchange of corresponding second control signaling comprises a control plane of the LTE standards, and wherein the second user data comprises a data plane of the 5G standards.

16. The method of claim 14, wherein the first set of mobile services comprises one of network slicing, separation of the control and data planes of the 5G standards, or any combination thereof.

17. A non-transitory, machine-readable medium, comprising executable instructions that, when executed by a processing system including a processor, facilitate performance of operations, the operations comprising:
  determining a capability of a mobile station;
  collecting at least one measurement corresponding to the mobile station, wherein the at least one measurement comprises a direction of travel of the mobile station as a mobility state of the mobile station;
  estimating a required wireless channel capacity of a mobile station requested service;
  obtaining a radio access network (RAN) type recommendation that is based upon the capability, the at least one measurement and the required wireless channel capacity, wherein the obtaining the RAN type recommendation comprises an artificial intelligence (AI) process that had previously been trained according to at least one training data set, wherein the RAN type recommendation is for one of a first RAN type or a second RAN type, wherein the first RAN type comprises a first base station adapted to support a first exchange of first user data and corresponding first control signaling between the first base station and the mobile station to facilitate mobile station access to a first set of mobile services comprising access to mobile edge computing regarding processing of the first user data, and wherein the second RAN type comprises second and third base stations, the second base station adapted to support a second exchange of second user data with the mobile station and the third base station adapted to support a corresponding exchange of second control signaling with the mobile station to facilitate mobile station access to a second set of mobile services, the second RAN type being unable to facilitate mobile station access to the first set of mobile services; and
  identifying one of the first RAN type and the second RAN type as a preferred RAN type according to the RAN type recommendation, a service being provided to the mobile station via the preferred RAN type.

18. The non-transitory, machine-readable medium of claim 17, wherein the first RAN type comprises a stand-alone architecture according to Third Generation Partnership Project (3GPP) fifth generation (5G) standards, wherein the first base station comprises a base station according to the 5G standards, and wherein the first exchange of first user data and corresponding first control signaling comprises control and data planes of the 5G standards.

19. The non-transitory, machine-readable medium of claim 18, wherein the second RAN type comprises a non-stand-alone architecture according to the 5G standards, wherein the second base station is a base station according to the 5G standards, wherein the third base station is a base station according to 3GPP Long Term Evolution (LTE) standards, wherein the corresponding exchange of second control signaling comprises a control plane of the LTE standards, and wherein the second user data comprises a data plane of the 5G standards.

20. The non-transitory, machine-readable medium of claim 18, wherein the first set of mobile services comprises one of network slicing, separation of the control and data planes of the 5G standards, or any combination thereof.

\* \* \* \* \*